United States Patent Office 2,840,533
Patented June 24, 1958

2,840,533

ANION-EXCHANGE RESINS CONTAINING WEAKLY AND STRONGLY BASIC FUNCTIONAL GROUPS

Jesse C. H. Hwa, Levittown, Pa., assignor to Rohm & Haas Company, Philadelphia, Pa., a corporation of Delaware No Drawing. Application May 20, 1954
Serial No. 431,278

15 Claims. (Cl. 260—2.1)

This invention relates to anion-exchange resins which contain weakly and strongly basic anion-adsorbing functional groups. Its object is to provide resins which contain strongly basic, quaternary ammonium, anion-adsorbing groups as well as weakly basic, primary, secondary or tertiary amino anion-adsorbing groups.

The resins of this invention are insoluble, cross-linked polymers of a vinyl aromatic hydrocarbon having attached to the aromatic nuclei thereof functional, anion-adsorbing groups of the general formula

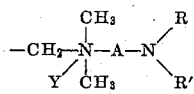

in which A represents an alkylene group of two to six carbon atoms—preferably an ethylene group—or the group

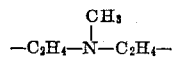

R and R' each represent a methyl or ethyl group or a hydrogen atom, and Y represents an anion such as a chloride, hydroxide, or sulfate group. The resins, by virtue of their quaternary ammonium groups, have the anion-adsorbing properties of strongly basic resins while at the same time they have the properties of weakly basic anion-adsorbers because of the presence of the terminal amino group, shown as

above. The combination of the quaternary ammonium groups and the other terminal amino groups gives the products of this invention a combination of properties which is not enjoyed by anion-exchange resins which contain only quaternary ammonium groups on the one hand or only primary, secondary or tertiary amino groups on the other. These resins have unusually high capacities per unit of volume and they are very readily regenerated. They are more efficient adsorbers of complex and large anions than resins containing, for example

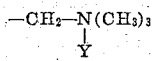

groups, despite the fact that it might well be expected that the latter would be better because of the compactness of the molecules of resin.

The products of this invention are made by reacting an amine, having the general formula

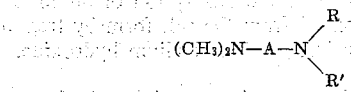

in which the characters, A, R and R', have the same significance as described above, with a chloromethylated, insoluble, cross-linked polymer of a monovinyl hydrocarbon—preferably styrene.

The chloromethylated resin is prepared by the general process which is described in U. S. Patent 2,591,573. Thus, a polymer of a monovinyl hydrocarbon is prepared by emulsions or suspension polymerization in the presence of a free radical catalyst such as an organic peroxidic compound. Currently, the preferred vinyl hydrocarbon is styrene; but other compounds such as vinyl toluene, vinyl naphthalene, ethyl styrene, vinyl anthracene and the homologues of these as well as mixtures of the same may be employed.

Ordinarily a copolymerizable polyvinylidene cross-linking agent is copolymerized with the monovinyl hydrocarbon in order to insure insolubility of the resin in common organic solvents and in aqueous solutions of acids, bases and salts. Divinylbenzene is much the preferred copolymerizable cross-linking agent since it is readily available and is a hydrocarbon which is not subject to hydrolysis. Other well-known cross-linking agents, however, which are polyvinylidene compounds because they contain two or more vinylidene groups, $CH_2=C<$, can be used, such as trivinylbenzene, divinyl toluenes, divinyl naphthalenes, divinyl ethyl benzenes, divinyl xylenes, ethylene glycol dimethacrylate, ethylene glycol diacrylate, diallyl maleate, divinyl ether, divinyl Cellosolve and the like. The amount of cross-linking agent which is employed is very important. From 0.5% to about 2% of the polyvinyl cross-linking agent, based on the total weight of the monovinyl hydrocarbon and the cross-linking agent, are employed. Actually about 1% of the cross-linking agent is the optimal amount and is therefore preferred.

In the next step, the cross-linked polymer is chloromethylated, as for example, by means of paraformaldehyde and hydrochloric acid or by means of chloromethyl ether and aluminum chloride. During this chloromethylating step some cross-linking takes place which increases the complexity and reduces the solubility of the resin. It is most desirable to carry the chloromethylation as far as is reasonably possible. The extent of chloromethylation can be measured by analyzing the product for chlorine. In commercial production an effort is made to introduce an average of about one chloromethylene group, —$CH_2Cl$, for each aromatic nucleus in the resin; but resins having as few as one chloromethylene group for every two aromatic nuclei have satisfactory utility.

In the final step, the chloromethylated resin is reacted with the amine having the formula

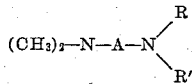

in which the characters A, R and R' have the significance described above. All of these amines contain a tertiary amino group and either a primary, secondary or another tertiary group. The reaction is preferably carried out at the highest convenient temperature while the particles of chloromethylated resin are suspended in a liquid medium such as water or an organic liquid, typified by toluene or ethylene dichloride. An aqueous medium is much preferred; and the reaction is preferably carried out at the boiling point of the reaction mixture. Best results are obtained when the particles of resin are swollen by means of an organic liquid such as ethylene dichloride prior to the amination step. It has been found that, for the most part, only one of the amino groups in a polyamine reacts with the chloromethyl groups of the resin; and that the reactivity of the other amino group or groups is greatly diminished once the first group in the molecule has reacted. Ordinarily only a very small amount, of the order of about 5%, of the polyamine does take part in the reaction in such a way that two of its amino groups react with chloromethyl groups on the resin. This results in further cross-linking of the product. It has also been found that the tertiary amino groups in the polyamine react almost exclusively and that the primary and secondary amino groups essentially remain intact.

Of the diamines which give rise to the products of this invention, those are much preferred in which the group between the two nitrogen atoms is an ethylene group and in which all of the alkyl substituents are methyl groups. That is to say, the most satisfactory products are those prepared from the amines having the following formulas: $(CH_3)_2N-C_2H_4-NH_2$, $(CH_3)_2N-C_2H_4-NHCH_3$ and $(CH_3)_2N-C_2H_4-N(CH_3)_2$. The products obtained by the reaction of these particular diamines have very high ion-adsorbing capacity of both the strongly basic and weakly basic type, and also have excellent regenerating characteristics.

The following examples serve to illustrate the preferred method of preparing the resins of this invention:

Example 1

Into a reactor equipped with thermometer, mechanical agitator and reflux condenser was charged 4000 ml. of water and 340 ml. of a 1.5% aqueous solution of magnesium silicate. Agitation was started and a mixture of 975 grams of styrene and 25 grams of commercial divinylbenzene (containing 10 grams of divinylbenzene and 15 grams of ethyl styrene) and 10 grams of benzoyl peroxide was added to the contents of the flask. The stirred mixture was heated to refluxing temperature and held there for approximately three hours. The cooled mixture was then filtered and the resinous spheroids were dried.

The dried product was next chloromethylated in a reactor equipped with thermometer, stirrer and reflux condenser. Thus, 2000 grams of chloromethyl methyl ether, $CH_3OCH_2Cl$, was added to the resin and the mixture was allowed to stand at room temperature for a half-hour during which time the particles of resin became swollen. To the mixture was added 2300 ml. of petroleum ether (B. P. 30°–60° C.); and agitation was begun. The mixture was cooled to 0° C. and 600 grams of anhydrous powdered aluminum chloride was slowly added over a period of about an hour. Stirring was continued for two hours while the mixture was maintained at 0° C. Then 10 liters of ice-water was slowly added and stirring was continued for a half-hour. The beads of resin were filtered off. The chloromethylated product contained 18.9% chlorine.

The beads of resin were covered with ethylene dichloride and thus swollen. They then contained 49.5% solids, the remainder being water and ethylene dichloride. A mixture of 700 grams of the moist resin, 800 ml. of water and 225 grams of N,N'-tetramethylethylenediamine, $(CH_3)_2NC_2H_4N(CH_3)_2$, was charged to a reactor equipped with thermometer, stirrer and reflux condenser. Stirring and heating were begun and the mixture was taken to refluxing temperature and held there for two hours. Next, 500 ml. of water was added and the condenser was set for downward distillation. Distillation was continued until no ethylene dichloride appeared in the distillate. Meanwhile water was added to replace that removed by distillation. After cooling to room temperature the resin, still in the form of spheroids, was thoroughly washed with water to neutrality. It contained as substituents on the aromatic nuclei groups having the formula

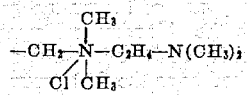

A yield of 992 grams of moist resin (50.7% solids) was obtained which had a density of 45.2 lbs./cu. ft. The resin had a total base capacity of 5.24 milliequivalents (meq.) per gram (dry basis) or 1.93 meq./ml. wet. Its quaternary ammonium capacity was 2.84 meq./g. dry and 1.04 meq./ml. wet. The quaternary ammonium capacity is a measure of the ability of the resin to split neutral salts such as sodium chloride and to exchange its anions for the anions of the salt, while the total base capacity is a measure of the ability of the resin to remove acids from solution by adsorption on the weakly basic amino groups (in this case, the terminal $-N(CH_3)_2$ groups) and by ion-exchange on the quaternary ammonium groups. In this resin the ratio of the measured quaternary ammonium capacity to the measured total capacity was about 54%.

Example 2

Into a reactor equipped with thermometer, agitator and reflux condenser was charged a mixture of 151 grams of N,N-dimethylethylenediamine, $(CH_3)_2NC_2H_4NH_2$, 550 ml. of water, and 458 grams of the chloromethylated beads of resin prepared in the process of Example 1 above. The beads of resin were swollen with ethylene dichloride, moistened with water, and contained 51.9% solids. The mixture was heated at refluxing temperature for five hours. Otherwise the process was the same as that described in Example 1. The product in this case had substituent groups of the formula

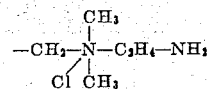

A yield of 605 grams of moist resin (49.7% solids) was obtained which had a density of 43.0 lbs./cu. ft. The total base capacities of the resin were 5.36 meq./g. dry and 1.84 meq./ml. wet. Its quaternary ammonium capacities were 2.58 meq./g. dry and 0.88 meq./ml. wet. This resin, like all of the products of this invention, is readily converted from the salt form to the hydroxyl form by treatment with a base, such as sodium hydroxide.

In the same manner as shown in the above examples, the other amines which are embraced by this invention and which have the general formula

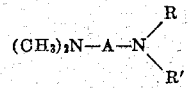

described above, are reacted with the chloromethylated, cross-linked copolymer. All of the products contain both strongly basic quaternary ammonium anion-exchanging functional groups and weakly basic anion-adsorbing functional groups. As such, they not only adsorb free acids from solutions, but they also split neutral salts in solution and exchange their own ions, represented by Y above, for the anions of the dissolved salt. Moreover they all have a high efficiency of regeneration. They can be converted to resins which have even greater quaternary ammonium capacity by the method described in another of my applications for Letters Patent, Serial No. 431,277 filed May 20, 1954, now U. S. Patent No. 2,725,361.

In the above description of the resins of this invention, the character Y has been used to represent an anion. The resins are normally prepared in the chloride form, in which case Y is a chloride group. They are, however, readily converted to other salt forms by treatment with other mineral acids, such as sulfuric acids, or with inorganic salts such as sodium, potassium or ammonium sulfates, in which cases Y represents the anion of the acid or salt employed. When the resins are to be used in the hydroxyl form for the adsorption of anions from fluids they are converted from the salt form by treatment with a solution of a base such as sodium hydroxide.

I claim:

1. An anion-exchange resin containing both weakly basic anion-adsorbing groups and strongly basic quaternary ammonium anion-adsorbing groups which comprises an insoluble, cross-linked copolymer of 98–99.5% of a monovinyl hydrocarbon and 0.5-2% of a polyvinylidene compound, said copolymer containing on the aromatic nuclei substituent groups having the general formula

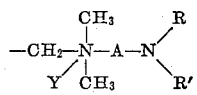

in which A represents a member of the class consisting of the radical

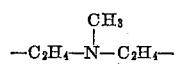

and divalent alkylene radicals of 2 to 6 carbon atoms, R and R' each represent a member of the class consisting of a methyl radical, an ethyl radical, and a hydrogen atom, and Y represents an anion, the number of said groups being from 5 to 10 for every 10 aromatic nuclei.

2. The product of claim 1 in which said polyvinylidene compound is divinylbenzene.

3. An anion-exchange resin containing both weakly basic anion-adsorbing groups and strongly basic quaternary anion-adsorbing groups which comprises an insoluble, cross-linked copolymer of 98-99.5% of a monovinyl hydrocarbon and 0.5-2% of a polyvinylidene compound, said copolymer containing on the aromatic nuclei substituent groups having the formula

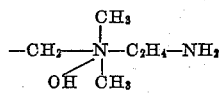

the number of said groups being 5 to 10 to every 10 aromatic nuclei.

4. A anion-exchange resin containing both weakly basic anion-adsorbing groups and strongly basic anion-adsorbing groups which comprises an insoluble cross-linked copolymer of about 99% styrene and about 1% of a polyvinylidene compound, said copolymer containing on the aromatic nuclei substituent groups having the formula

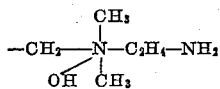

the number of said groups being 5 to 10 for every 10 aromatic nuclei.

5. The product of claim 4 in which said polyvinylidene compound is divinylbenzene.

6. An anion-exchange resin containing both weakly basic anion-adsorbing groups and strongly basic quaternary anion-adsorbing groups which comprises an insoluble, cross-linked copolymer of 98-99.5% of a monovinyl hydrocarbon and 0.5-2% of a polyvinylidene compound, said copolymer containing on the aromatic nuclei substituent groups having the formua

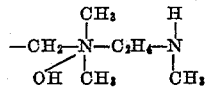

the number of said groups being 5 to 10 for every 10 aromatic nuclei.

7. An anion-exchange resin containing both weakly basic anion-adsorbing groups and strongly basic anion-adsorbing groups which comprises an insoluble cross-linked copolymer of about 99% styrene and about 1% of a polyvinylidene compound, said copolymer containing on the aromatic nuclei substituent groups having the formula

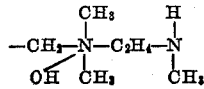

the number of said groups being 5 to 10 for every 10 aromatic nuclei.

8. The product of claim 7 in which said polyvinylidene compound is divinylbenzene.

9. An anion-exchange resin containing both weakly basic anion-adsorbing groups and strongly basic quaternary anion-adsorbing groups which comprises an insoluble, cross-linked copolymer of 98-99.5% of a monovinyl hydrocarbon and 0.5-2% of a polyvinylidene compound, said copolymer containing on the aromatic nuclei substituent groups having the formula

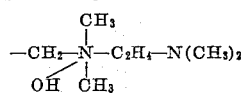

the number of said groups being 5 to 10 for every 10 aromatic nuclei.

10. The product of claim 9 in which said monovinyl hydrocarbon is styrene and said polyvinylidene compound is divinylbenzene.

11. An anion-exchange resin containing both weakly basic anion-adsorbing groups and strongly basic anion-adsorbing groups which comprises an insoluble cross-linked copolymer of about 99% styrene and about 1% of a polyvinylidene compound, said copolymer containing on the aromatic nuclei substituent groups having the formula

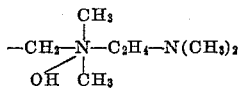

the number of said groups being 5 to 10 to every 10 aromatic nuclei.

12. The product of claim 11 in which said polyvinylidene compound is divinylbenzene.

13. An anion-exchange resin containing both weakly basic anion-adsorbing groups and strongly basic quaternary anion-adsorbing groups which comprises an insoluble, cross-linked copolymer of 98-99.5% of a monovinyl hydrocarbon and 0.5-2% of a polyvinylidene compound, said copolymer containing on the aromatic nuclei substituent groups having the formula

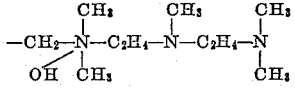

the number of said groups being 5 to 10 for every 10 aromatic nuclei.

14. An anion-exchange resin containing both weakly basic anion-adsorbing groups and strongly basic anion-adsorbing groups which comprises an insoluble cross-linked copolymer of about 99% styrene and about 1% of a polyvinylidene compound, said copolymer containing on the aromatic nuclei substituent groups having the formula

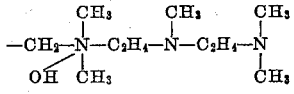

the number of said groups being 5 to 10 for every 10 aromatic nuclei.

15. The product of claim 14 in which said polylvinylidene compound is divinylbenzene.

References Cited in the file of this patent

UNITED STATES PATENTS

| | | |
|---|---|---|
| 2,591,573 | McBurney | Apr 1, 1952 |
| 2,630,427 | Hwa | Mar. 3, 1953 |
| 2,683,125 | D'Alelio | July 6, 1954 |